(12) United States Patent
Tyler et al.

(10) Patent No.: US 8,745,602 B2
(45) Date of Patent: Jun. 3, 2014

(54) AUTOMATIC CONFIGURATION OF PROJECT SYSTEM FROM PROJECT CAPABILITIES

(75) Inventors: Brian Mead Tyler, Bothell, WA (US); Kieran Paul Mockford, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 1058 days.

(21) Appl. No.: 12/434,693

(22) Filed: May 4, 2009

(65) Prior Publication Data

US 2010/0281461 A1    Nov. 4, 2010

(51) Int. Cl.
  *G06F 9/45* (2006.01)
  *G06F 9/44* (2006.01)
(52) U.S. Cl.
  USPC .......................................... 717/140; 717/135
(58) Field of Classification Search
  None
  See application file for complete search history.

(56) References Cited

U.S. PATENT DOCUMENTS 6,493,868 B1    12/2002  DaSilva et al.
7,337,436 B2 *  2/2008   Chu et al. ...................... 717/140
2002/0184610 A1  12/2002  Chong et al.
2006/0101443 A1  5/2006   Nasr
2006/0212857 A1  9/2006   Neumann et al.
2007/0006176 A1* 1/2007   Spil et al. ...................... 717/135
2007/0050762 A1  3/2007   Chen et al.

OTHER PUBLICATIONS

Luparu, Marian, "Visual C++ Team Blog", Retrieved at <<http://blogs.msdn.com/vcblog/archive/2008/11/20/printf-hello-msbuild-n.aspx>>, Mar. 5, 2009, pp. 10.
"Team Development with Visual Studio .NET and Visual SourceSafe", Retrieved at <<http://msdn.microsoft.com/en-us/library/ms998223.aspx>>, Microsoft Corporation, Jan. 2002, pp. 9.
Glick, Jesse, "NetBeans 4.x Project & Build System How-To", Retrieved at <<http://projects.netbeans.org/buildsys/howto.html>>, Jun. 21, 2006, pp. 8.

\* cited by examiner

*Primary Examiner* — Hyun Nam
(74) *Attorney, Agent, or Firm* — Kevin Sullivan; Kate Drakos; Micky Minhas

(57) ABSTRACT

A project system is automatically configured from project capabilities determined from an instance of a build system by a project capabilities analyzer. A flexible configuration based build system defines the consuming project system. Results of an evaluated project file are used to define the overall capabilities of the build system. The capabilities are used to dynamically load and assemble the project system code. Changes in the project capabilities due to a reevaluation of a result of a build can then redefine and reassemble the project system code. Hence project system configuration is data-driven rather than user-defined and utilizes a flexible, configuration based build system to define the consuming project system.

19 Claims, 4 Drawing Sheets

AUTOMATIC CONFIGURATION OF PROJECT SYSTEM FROM PROJECT CAPABILITIES

BACKGROUND

A build system is a set of rules, commands and processes that are used to convert source code to binary assets. A build process actually builds the product. It is generally considered a best practice to execute a build process in as automated a manner as feasible, with as little human interaction as possible. A build process typically includes at least compiling source code for an application into compiled code and may include additional steps associated with the compiling of the source code such as, for example, executing acceptance tests. An automated build process is a build process in which there is no human intervention during the performance of the automated build process. An automated build process is usually performed by executing a series of scripts that are manually coded from scratch. The scripts direct the execution of build tools.

An integrated development environment (IDE) is a software application that provides comprehensive facilities for developers of software. An IDE normally includes at least a source code editor, a compiler and/or interpreter, build automation tools and a debugger. A version control system and various other tools may also be integrated into the IDE to simplify the software development process. Some IDEs also have a class browser, an object inspector, and a class hierarchy diagram, for use with object-oriented software development. Typically an IDE is dedicated to a specific programming language so that a set of features that match the programming paradigms of the language can be provided. However, some multiple-language IDEs are known, such as Eclipse, ActiveState Komodo, recent versions of NetBeans, Microsoft Visual Studio and WinDev.

An IDE typically presents a single environment in which all development occurs and provides a number of features for authoring, modifying, compiling, deploying and debugging software. The aim of the IDE is to increase programmer productivity. Some IDEs are graphical, while others are text-based and use function keys or hotkeys to perform various tasks. Software development can also be performed outside an IDE, using unrelated tools, such as vi, GCC or make.

SUMMARY

A project system is automatically and dynamically assembled from project capabilities of an instance of a build system. A flexible configuration based build system defines the consuming project system. Evaluation of the results of a build directed by a project file are used to determine the overall capabilities of the build system. The capabilities are used to dynamically load and assemble the project system code. Changes in the project capabilities due to a reevaluation of the build input files can then redefine and cause reassembly of the project system code. Hence project system configuration is data-driven rather than user-defined and utilizes a flexible, configuration based build system to define the consuming project system.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Overview

Figure 1:
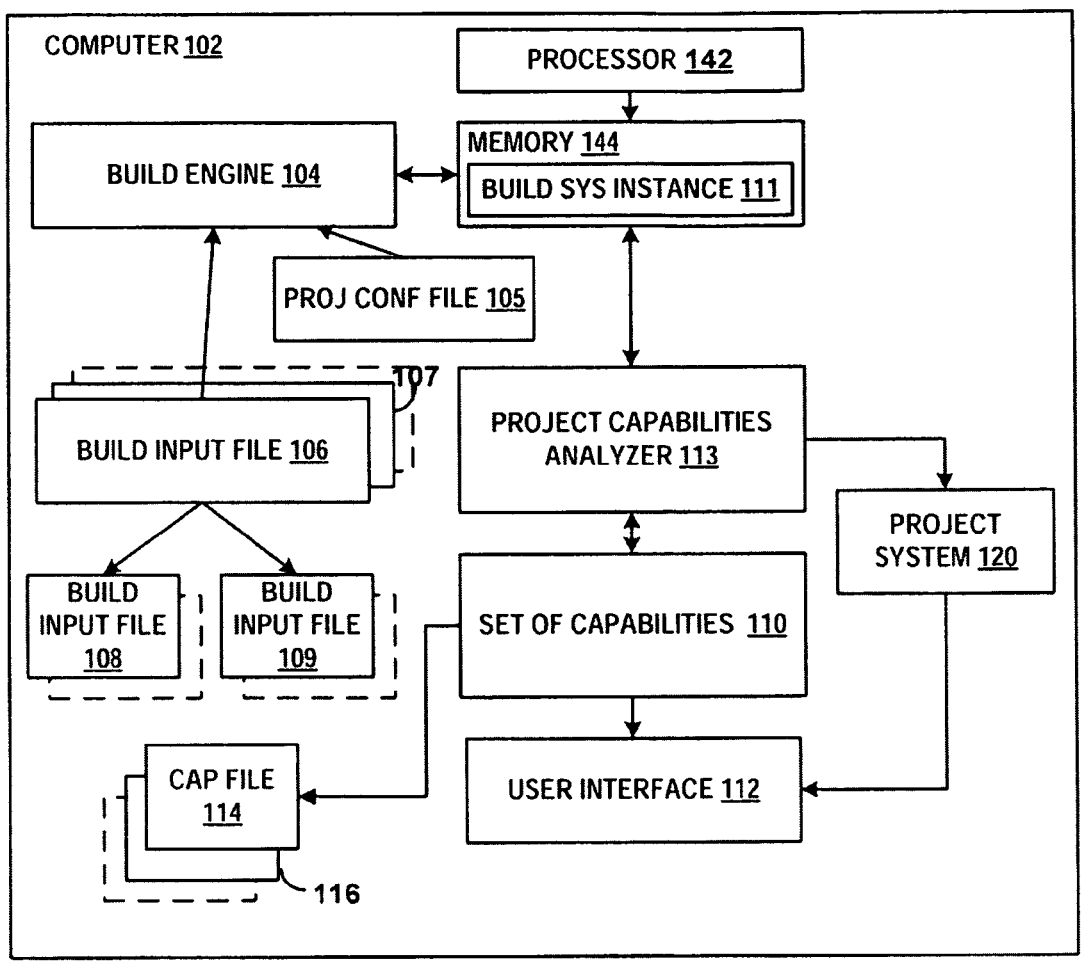
FIG. 1 is a block diagram of an example of a system for automatic configuration of a project system from project capabilities in accordance with aspects of the subject matter disclosed herein.

Most enterprises use software that is coded in several programming languages. A separate project system is created for each programming language used. For example, if an enterprise uses software written in C++, C#, Visual Basic (VB), F# and Java, there will be a C++ project system, a C# project system, a Visual Basic (VB) project system, an F# project system and a Java project system. Each of these different project systems has its own code base and therefore has different capabilities, bugs, performance characteristics and abilities. If the enterprise wants to use a particular feature of an IDE, (such as code analysis, for example) on all of the project systems, the enterprise would have to separately implement the feature in each of the project systems. Visual Studio provides a partial solution for customization of different project systems that are written in a single language. This solution, Flavors, provides the ability to customize by wrapping project systems, so that some method calls are intercepted and delegated to another project system. Flavors can be implemented by creating a new list of COM class identifiers (CLSIDs) in a build input file. Flavors can wrap more than one language but, because the project systems associated with the different languages are different, it is complex to cause a single flavor to wrap multiple systems. In contrast, the subject matter disclosed herein describes a solution in which a project system is dynamically loaded and assembled based on capabilities of the associated build system. Changes in project capabilities can result in the redefinition and reassembly of the project system code.

In some build systems, such as in MSBuild, for example, instructions for the build are encoded in a project file. The flexible format of the project file enables developers to fully describe what items need to be built as well as how they need to be built with different platforms and configurations. Project configurations are also provided. Project configurations can be passed in at the command line during a build—or can be selected in the UI of the IDE by the user. Project configurations typically are switches used to control the build, such as what platform is being targeting (x86, Xbox, Mobile Phone, etc) and whether or not a debuggable build is desired. The project is then evaluated with these project configurations. Typically, evaluating the project again with the same project configurations results in the same evaluation. Thus to get a different evaluation—and therefore get potentially different project capabilities—a different set of project configurations are supplied.

When a project file (such as an MBuild project file) is loaded into an integrated development environment (IDE), the IDE (e.g., Visual Studio) ensures that the correct project system code is loaded by associating the project file extension with the project type. For example, if the project being loaded is a C# project, the project file would be named *.csproj and the C# project system codebase would be loaded. If the project being loaded is a Visual Basic project, the project file would be name *.vbproj and the Visual Basic project system codebase would be loaded. The one-to-one association of a project file extension with a project type limits the available mappings between a project system and the project file. The build process that utilizes the project file can be highly customizable and can be radically different based on the project configuration. For example, a C++ project file can be used by a build system that can produce products for Windows, the web, a mobile device or the Xbox. All of these require different project systems, but share a single file extension.

Current project systems support the concept of project types. Project type is a project property in the project file that lists a sequence of class identifiers that make up the project system. The project system is assembled by aggregating the identified classes. Limitations of this approach include the following. First, this approach supports an aggregation-only scenario of project system customization. Second, underlying abilities of the build system are explicitly stated in the project file (which can therefore become out of date). Third, it does not handle changes in the build system capabilities when the project configuration is applied. For example, consider an application (such as a game) made to run on Windows, the web, a mobile device and the Xbox. Changing the target platform radically changes the underlying build system and thus can require different project system code. A static list of project type IDs cannot handle these dynamic changes.

To address these and other aspects of software development in an IDE, in accordance with aspects of the subject matter disclosed herein, a project system is dynamically assembled based on the capabilities of the underlying instance of the build system. The capabilities of the build system instance are used to dynamically load and assemble the project system code. If the capabilities of the build system change, the project system code is redefined and reassembled. For example, consider an existing automated build system. In this example, an existing automated build engine such as MSBuild is used. The leaf project file or manifest is the file loaded by the user (e.g., myproject.csproj). Today's MSBuild project file format enables developers to fully describe what items need to be built and how they need to be built with different platforms and configurations. Re-usable build rules can be authored that can be factored into separate files so that builds can be performed consistently across different projects within their product. The following sections describe some of the elements of the content of the project file.

Items represent inputs into the build system and are grouped into item collections based on their user-defined collection names. Item collections can be used as parameters for tasks, which use the individual items contained in the collection to perform the steps of the build process. Items are declared in the project file by creating an element with the name of the item collection as a child of an ItemGroup element. For example, the following code creates an item collection named Compile, which includes two files.

```
<ItemGroup>
    <Compile Include = "file1.cs"/>
    <Compile Include = "file2.cs"/>
</ItemGroup>
```

Item collections are referenced throughout the project file with the syntax @(ItemCollectionName). For example, the item collection in the example above is referenced with @(Compile). Items can be declared using wildcards and may contain additional metadata for more advanced build scenarios. Item definition groups are similar to item groups and can include item definitions that define items.

Properties represent key/value pairs that can be used to configure builds. Items and properties differ in the following ways:
- Items are stored in collections, while properties contain a single scalar value.
- Items are capable of holding multiple values per name while properties have a single value per name.
- Items can contain metadata and can use the %(ItemMetadata) notation, while properties cannot.

Properties are declared by creating an element with the name of the property as a child of a PropertyGroup element. For example, the following code creates a property named BuildDir with a value of Build.

```
<PropertyGroup>
    <BuildDir>Build</BuildDir>
</PropertyGroup>
```

Properties are referenced throughout the project file with the syntax $(PropertyName). For example, the property in the example above is referenced with $(BuildDir).

Tasks are reusable units of executable code used by MSBuild projects to perform build operations. For example, a task might compile input files or run an external tool. Once created, tasks can be shared and reused by different developers in different projects. The execution logic of a task is written in managed code and is mapped to MSBuild with the UsingTask element. A task can be written by authoring a managed type that implements the ITask interface. A task in an MSBuild project file can be executed by creating an element with the name of the task as a child of a Target element. Tasks usually accept parameters, which are passed as attributes of the element. MSBuild item collections and properties can be used as parameters. For example, the following code calls the MakeDir task and passes it the value of the BuildDir property declared in the previous example.

```
<Target Name="MakeBuildDirectory">
    <MakeDir
        Directories="$(BuildDir)" />
</Target>
```

Targets group tasks together in a particular order and expose sections of the project file as entry points into the build process. Targets are often grouped into logical sections to allow for expansion and to increase readability. Breaking the build steps into many targets allows one piece of the build process to be called from other targets without having to copy that section of code into each target. For example, if several entry points into the build process request references to be built, a target that builds references can be created and that target can be run from each entry point that wants to build references. Targets are declared in the project file with the Target element. For example, the following code creates a target named Compile, which then calls the Csc task with the item collection declared in the previous example.

```
<Target Name="Compile">
    <Csc Sources="@(Compile)" />
</Target>
```

Targets can describe relationships between each other and perform dependency analysis, which allows whole sections of the build process to be skipped if that target is up-to-date.
Automatic Configuration of Project System from Project Capabilities An example of a configuration based build system and project file is now considered. In this example, an existing MSBuild system for C# is used (see below), although it will be appreciated that the subject matter disclosed herein can apply to any build system. The leaf project file (manifest) is the file loaded by the user (e.g., myproject.csproj). An example of such a file is reproduced below.

The first bolded line shows an existing ProjectType property that can be used to tell the IDE (e.g., Visual Studio) what software components (e.g., what COM components) to load in response to processing this particular project file. The ProjectType property can be eliminated with a capability-driven project system (hence the strike-out above). The second and last bolded line directs the importation of targets. This import statement links together the user's project file and parts of the build system. This target file can then import additional files such as, for example, the Microsoft.Common.targets. Although not shown in this example, these imports can also be conditional. For example, an import can be conditional on project configuration. That is the build rules for an x86 platform can be and typically are stored in a separate file than the build rules for an Xbox are stored. Imports can also be conditional on the existence or non-existence of a target file. This allows the build system to pick up parts that may or may not be installed on the target machine. For example, Microsoft.VC.Win32.targets can be imported to build a Windows product or Microsoft.VC.Xbox.targets can be imported to build an Xbox product. Hence, this statement can be used to provide more fine-grained control over the project system (e.g., what targets are imported can depend on the platform the build is currently targeting).

Multiple target files can be aggregated with the project file during project loading. In accordance with aspects of the

```
<?xml version="1.0" encoding="utf-8"?>
<Project ToolsVersion="3.5" DefaultTargets="Build"
xmlns="http://schemas.microsoft.com/developer/msbuild/2003">
    <PropertyGroup>
        <Configuration Condition=" '$(Configuration)' == '' ">Debug</Configuration>
        <Platform Condition=" '$(Platform)' == '' ">AnyCPU</Platform>
        <ProductVersion>9.0.20608</ProductVersion>
        <SchemaVersion>2.0</SchemaVersion>
        <ProjectTypeGuids>{60de8134-eba5-43b8-bee9-bb4be16e2548};{FAE04EC0-301F-11D3-BF4B-00C04F79EFBC}</ProjectTypeGuids>
        <OutputType>Library</OutputType>
        <AppDesignerFolder>Properties</AppDesignerFolder>
        <RootNamespace>ClassLibrary1</RootNamespace>
        <AssemblyName>ClassLibrary1</AssemblyName>
        <TargetFrameworkVersion>v3.5</TargetFrameworkVersion>
        <FileAlignment>512</FileAlignment>
    </PropertyGroup>
    <PropertyGroup Condition=" '$(Configuration)|$(Platform)' == 'Debug|AnyCPU' ">
        <DebugSymbols>true</DebugSymbols>
        <DebugType>full</DebugType>
        <Optimize>false</Optimize>
        <OutputPath>bin\Debug\</OutputPath>
        <DefineConstants>DEBUG;TRACE</DefineConstants>
        <ErrorReport>prompt</ErrorReport>
        <WarningLevel>4</WarningLevel>
    </PropertyGroup>
    <PropertyGroup Condition=" '$(Configuration)|$(Platform)' == 'Release|AnyCPU' ">
        <DebugType>pdbonly</DebugType>
        <Optimize>true</Optimize>
        <OutputPath>bin\Release\</OutputPath>
        <DefineConstants>TRACE</DefineConstants>
        <ErrorReport>prompt</ErrorReport>
        <WarningLevel>4</WarningLevel>
    </PropertyGroup>
    <ItemGroup>
        <Reference Include="System" />
        <Reference Include="System.Core">
            <RequiredTargetFramework>3.5</RequiredTargetFramework>
        </Reference>
    </ItemGroup>
    <ItemGroup>
        <Compile Include="Class1.cs" />
    </ItemGroup>
    <Import Project="$(MSBuildBinPath)\Microsoft.CSharp.targets" />
</Project>
``` subject matter disclosed herein, project loading can be but does not have to be performed by the build engine. Each target file, or conditional section of a target file can define an item of type ProjectCapability with a value describing the capability. An example of an MSTest project using the VB language is presented. The project file for the VB language in this example would have an import for Microsoft.VisualBasic.targets and, perhaps, an import for Microsoft.MSTest.targets. The first target file can define, for example, a capability of "VBLanguage" and the second can define, for example, a capability for "MSTest". These statements describe what the files add to the overall build system for this project and are not necessarily related to specific pieces of code in the project system.

Capabilities can be defined implicitly or explicitly. For example, if a Microsoft.VC.Win32.targets file defines a capability of Win32Platform and the Microsoft.VC.Xbox.targets file defines a capability of XBoxPlatform, a project that targets an Xbox platform may import a file called Microsoft.VC.$(Platform).targets using the project configuration property $(Platform) to dynamically create the file name Microsoft.VC.Xbox.targets to import the Xbox targets file. In this case the project system treats the $(Platform) project configuration as a capability. Alternatively, a project capability, such as XBoxPlatform, can be explicitly defined. It will be appreciated that the targets file itself can define additional explicit project capabilities, and/or can result in more implicit capabilities Once the project file and associated targets, etc. have been loaded and the collection of project capabilities for the configuration have been found, the project system can be created. Capability values can be mapped to one or more files. The files can be XML files such as but not limited to the capability name with an XML file extension, (e.g., for a project written in C#, "CSharpLanguage.xml" and so on. Examples of capabilities for which values can be mapped to capability files include but are not limited to platform (x86, Xbox, etc.), language (VB, C#, etc), technology (Silverlight, WPF, WinForms, etc.), frameworks (MSTest, Installer, etc.), target (Database, Website, etc.) and so on. These files can define the set of classes to be used for pre-defined interfaces. For example, the set of classes needed to build, debug or deploy a product or the list of source files or project-to-project references can be specified. The way in which the capability value is mapped to code includes any means well-known in the art, and include such technologies such as MEF (Managed Extensibility Framework) however, in each case, the association between the correct code to process the project file and the project file is defined by the set of capabilities of the instance of the build system generated by the project load.

FIG. 1 illustrates an example of a system 100 that dynamically configures a project system from project capabilities in accordance with aspects of the subject matter disclosed herein. Within this context, dynamic configuration refers to determination of what is loaded into the IDE depending on the content of the project file and what is already installed in the IDE, in contrast to known systems in which what is loaded into the IDE is determined by a pre-defined set of components for the type of project being loaded. That is, while existing systems may load a predetermined set of components, x, y and z for a C# project, a dynamically configured project system for C# receives capabilities as inputs and builds up the project system based on what parts of the project system indicate knowledge of or association with the C# capability. Whenever the IDE is restarted, the dynamic configuration process is repeated. Moreover, if changes to the build system occur, the next time the project loads, the new capabilities are discovered and used.

Suppose a project that uses a particular technology is loaded, and the loaded technology is associated with another component that is not available. In this case, a default component or no component may be loaded. Should the associated component subsequently become available, it will be automatically loaded when the IDE is restarted. For example, suppose a project that uses Silverlight is loaded, but the Silverlight graphical visualizer for some element of the project is not loaded. When the project is loaded, the Silverlight capability is discovered and a request for a Silverlight visualizer may be issued. If the Silverlight visualizer is not available, the default visualizer may be loaded instead. If the Silverlight graphical visualizer is subsequently installed into the IDE, the next time the project is loaded, a dynamic query for the visualizer will be made and the Silverlight visualizer will be automatically loaded.

Referring now to FIG. 1, all or portions of system 100 may reside on one or more computers such as the computers described below with respect to FIG. 3. All or portions of system 100 may reside on one or more software development computers (e.g., computer 102) such as the computers described below with respect to FIG. 4. The system 100 or portions thereof may comprise a portion of an integrated development environment (IDE) such as the ones described and illustrated below with respect to FIG. 4. Alternatively, system 100 or portions thereof may be provided as a stand-alone system or as a plug-in. System 100 may include one or more of: one or more processors (such as processor 142), a memory 144, a build engine 104, a project capabilities analyzer 113 (also referred to as a project capabilities analysis module), build input files 106, 107, 108, 109 etc., one or more project configuration files 105, a set of capabilities 110, a project system 120 and a development user interface 112. An application can include a number of projects. A project can include compilation settings, source code, other project artifacts and assembly references. Build engine 104 may receive information concerning how the executable for a project is to be built from a project configuration file such as project configuration file 105 that includes major switches for the build such as the target platform and so on.

Build input files may include one or more project files, for example, build input files 106, 107, etc. may represent project files. Build input files may also include one or more target files. For example build input file 108, etc., and build input file 109, etc may represent target files. Build input files provide instructions to the build engine 104 concerning what items are to be built for a particular product, (e.g., a product can be a game, an on-line buying service or any software product) how the items are to be built for different platforms and configurations (e.g., how a game that runs on a mobile device is to be built or how a game that runs on a desktop computer is to be built and so on). In short, build input files provide instructions for how an executable for the product is to be built. For example, a build input file can be a file such as but not limited to an XML file that describes what tools are to be run and what files the tools are to be run on. The build input file may specify settings and configuration values. Capabilities of the product can be but do not have to be explicitly declared in the build input files. For example, the format of the build input file may enable the author of the build input file to describe components used by the build and to describe components used by software (e.g., IDE) that hosts the build. An example of this is the line:

```
<ProjectTypeGuids>{60dc8134-eba5-43b8-bcc9-bb4bc16c2548};
{FAE04EC0-301F-11D3-BF4B-00C04F79EFBC}</ProjectTypeGuids>
```

This line can be used by the IDE to identify the software components to load into the IDE and may be ignored by the build system. This way of identifying components of the project system can be deprecated in the configuration-based project system assembly described herein.

Build input files including one or more project files such as build input file 106 and one or more target files such as build input file 108 and build input file 109, etc. may be used by the build engine such as build engine 104 to create an instance of a build system 111 in memory 144. In accordance with aspects of the subject matter disclosed herein, instead of a static list of components being explicitly declared in the build input files, capabilities of the product can be determined by evaluating the results of the build engine processing the build input files, and software components associated with the determined capabilities can be used for assembly of project system 120. That is, the project capabilities analyzer 113 may generate the project system 120 based on the determined set of capabilities 110, displaying corresponding options, etc. in user interface 112.

Referring back to the project file listed above, instead of including the line:

```
<ProjectTypeGuids>{60dc8134-eba5-43b8-bcc9-bb4bc16c2548};
{FAE04EC0-301F-11D3-BF4B-00C04F79EFBC}</ProjectTypeGuids>
``` in the project file, the line reproduced above can be eliminated from the project file and instead, capabilities can be determined by the project capabilities analyzer 113 from the build system instance 113, wherein the declared capabilities are linked to components associated with that capability as specified in capability files such as capability files 114, 116, etc. or via other technologies such as MEF and so on. Capabilities of the instance of the build system can be determined from an evaluation of the project file and from evaluation of the files referenced in the project file. Capabilities of the build system can be determined from an evaluation of a result of the build system processing the project file and files referenced in the project files (e.g., from build system instance 111.

The project file may include a statement such as but not limited to:
    <Import Project="$(MSBuildBinPath)\Microsoft.C-Sharp.targets"/>
This line specifies that the project includes the contents of the target file "Microsoft.CSharp.targets". The specified target file can include further information concerning capabilities of the project. For example, the target file can include an item group such as:

```
<ItemGroup>
    <ProjectCapabilities Include="CSharpLanguage"/>
<ItemGroup>
``` which specifies that the capability comprising use of the C# programming language is to be included in the project. It will be appreciated that the above is an example of one way in which the build system can provide information to the IDE. Other ways include but are not limited to conveying information by the name of the target file that is brought in or imported, or by the directory location from which the target file is brought in, the presence of a particular file with a particular extension, the presence of a target, the presence of a task or by any well-known programming technique. That is, the capabilities may be encoded in any way within the build system as long as the build system conveys to the IDE the capabilities of the project. For example, evaluation of the result of processing of the project file can determine the language the project is coded in, whether or not the product works with a web site, whether or not the project is a unit test project, whether or not the product displays a user interface or is a project that is used for a service that runs in the background and so on.

Capabilites determined by the project capabilities analyzer 113 from the build system instance can be conveyed to the IDE. The information available from the processed project file can be provided to the IDE or the IDE can query the build system instance to determine or describe to the IDE what the project is capable of. In response to this information, different functionality in the IDE can be offered to the user (e.g., via user interface 112). For example, if a project includes building user interface assets, then the IDE can make a user interface designer available to the user. Alternatively, if a project does not have user interface assets in it that have to be built, the IDE does not have to make the user interface designer available to the user. Hence, data-driven capabilities provide the ability to aggregate components on demand and provide a finer degree of granularity. For example, suppose a program that runs in Windows is being developed. The executable can be built using the build system and the executable can be run. The executable can be used to target a mobile telephone instead of Windows by deploying the executable to the mobile telephone by downloading via a wireless connection. This operation is frequently referred to as a deploy operation. The IDE can determine whether or not to light up a deploy functionality in the IDE by discovering from the build system if a deploy step has been declared in the build process. The project capabilities analyzer 113 can query the build system for presence of a deploy action and in response to the response received, either light up the deploy function in the IDE if a deploy action is present in the build system or gray out the deploy function (or fail to display the deploy function as an option) in the IDE if a deploy action is not present in the build system.

Moreover, when functionality not originally available is added, the project system can be redefined and reassembled. Suppose for example, a third party introduces a new feature to Visual Studio, the new feature not included in the original Visual Studio software. A respective project capability could be added via the project file or target files describing the design components to be loaded into the IDE, so that the build system can inform Visual Studio to load particular components for the new functionality.

Project capabilities analyzer 113 can create and/or store a set of capabilities 110 determined from the instance of the build system loaded into memory 144 as a set of data (e.g., capability files 114, 116, etc.) that is passed in to the IDE, telling the IDE the software components that the IDE is to assemble. The functionality associated with the assembled components can be displayed to the user (e.g., software developer) via one or more user interfaces such as user interface 112. For example, if one of the capabilities of the project is source code editing of C#, one of the components that would be loaded into the project would be the C# source code editor. If one of the capabilities of the project is profile analysis, one of the components that would be loaded into the project would be the profile analyzer. As the capabilities of the build system change, the project system is reevaluated and reassembled. Suppose for example, a user decides to change from Windows Forms to Windows Presentation Foundation for windowing. Windows Presentation Foundation uses a different window forms designer than does Windows Forms.

In this case, the user can bring up the project configuration tool and can select an option that displays available UI technologies. A drop down list of all of the installed UI technologies may be presented (for example, different UI technologies may include WinForms, WPF, and ASP.NET). Next, the user can change from WinForms to WPF by selecting WPF in the drop down list. In response, the IDE then can remove the assembly reference System.Windows.Forms and add System.Windows.Presentation from the IDE. It can then add the property to the project file:

```
<PropertyGroup>
    <UseWPF>true</UseWPF>
    <UseWinForms>false</UseWinForms>
</PropertyGroup>
```

When the project file is re-evaluated, the import line in the Microsoft.CSharp.targets to import Microsoft.WPF.targets can be checked. The import may be conditional so that it is only loaded if UseWPF is true. Because the value of UseWPF is "true", the import is loaded.

A set of project capability definitions may be included within Microsoft.WPF.targets which cause the project system to add "WPF Designer" to the list of designers in the menu system. Similarly, the Microsoft.WinForms.targets file can be conditionally loaded based on the value of UseWinForms. Because UseWinForms is false, the import is not loaded and the project capabilities it defined are no longer part of the collection of capabilities. This results in its designer no longer appearing in the menu system. The project system can dynamically redefine and reassemble the project.

Figure 2:
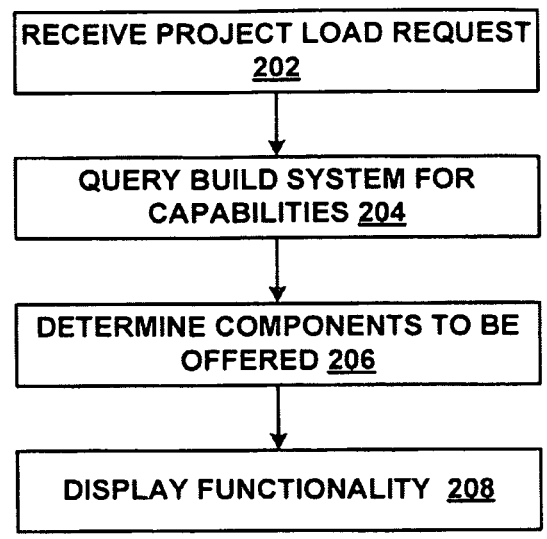
FIG. 2 is a flow diagram of an example of a method for automatic configuration of a project system from project capabilities n in accordance with aspects of the subject matter disclosed herein.

FIG. 2 illustrates a method 200 of automatically configuring a project system from project capabilities in accordance with aspects of the subject matter disclosed herein. At 202 a request for a project load is received. In response to the project load request, a build engine may load project files into memory, as described more fully above to create an instance of a build system. At 204 the instance of the build system is queried to determine project capabilities. As described more fully above, the project system may query the build system to determine project capabilities. Project capabilities may be encoded within the build system. Project capabilities may be explicitly defined in build input files or may be deduced by the content of build input files or may be otherwise linked to the build system as described more fully above. At 206 components of the IDE associated with the capabilities may be determined. Components associated with a particular capability may be specified in capability files as described above. At 208 the functionality associated with the capabilities may be offered to the user, for example via one or more user interfaces, as described more fully above. It will be appreciated that the process described above can be repeated so that whenever the capabilities of a project change, the project system will automatically reflect the changes when it is next loaded.

Example of a Suitable Computing Environment

Figure 3:
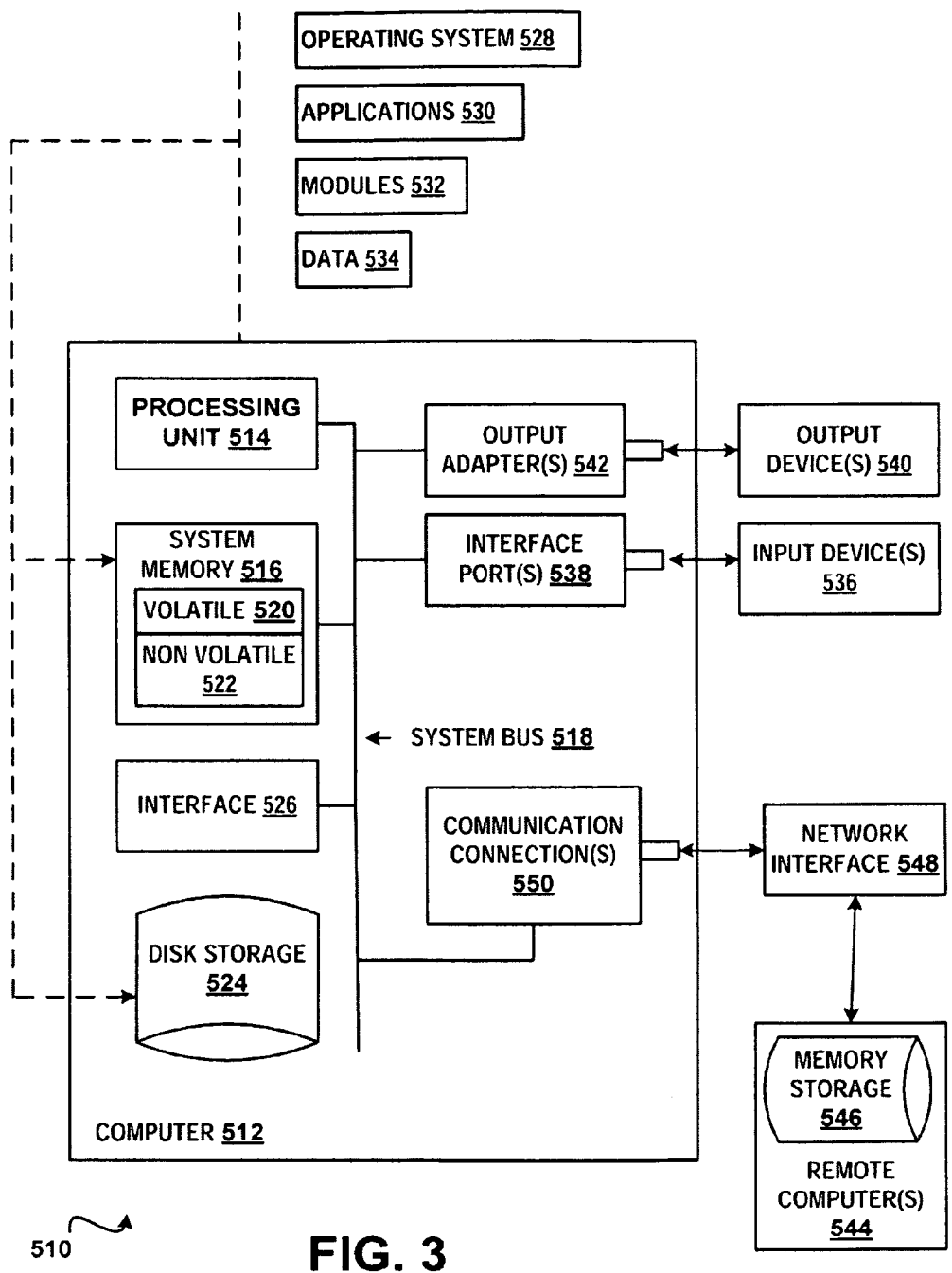
FIG. 3 is a block diagram illustrating an example of a computing environment in which aspects of the subject matter disclosed herein may be implemented.

In order to provide context for various aspects of the subject matter disclosed herein, FIG. 3 and the following discussion are intended to provide a brief general description of a suitable computing environment 510 in which various embodiments may be implemented. While the subject matter disclosed herein is described in the general context of computer-executable instructions, such as program modules, executed by one or more computers or other computing devices, those skilled in the art will recognize that portions of the subject matter disclosed herein can also be implemented in combination with other program modules and/or a combination of hardware and software. Generally, program modules include routines, programs, objects, physical artifacts, data structures, etc. that perform particular tasks or implement particular data types. Typically, the functionality of the program modules may be combined or distributed as desired in various embodiments. The computing environment 510 is only one example of a suitable operating environment and is not intended to limit the scope of use or functionality of the subject matter disclosed herein.

With reference to FIG. 3, a computing device for generating libraries for reflection without project compilation in the form of a computer 512 is described. Computer 512 may include a processing unit 514, a system memory 516, and a system bus 518. The processing unit 514 can be any of various available processors. Dual microprocessors and other multi-processor architectures also can be employed as the processing unit 514. The system memory 516 may include volatile memory 520 and nonvolatile memory 522. Nonvolatile memory 522 can include read only memory (ROM), programmable ROM (PROM), electrically programmable ROM (EPROM) or flash memory. Volatile memory 520 may include random access memory (RAM) which may act as external cache memory. The system bus 518 couples system physical artifacts including the system memory 516 to the processing unit 514. The system bus 518 can be any of several types including a memory bus, memory controller, peripheral bus, external bus, or local bus and may use any variety of available bus architectures.

Computer 512 typically includes a variety of computer readable media such as volatile and nonvolatile media, removable and non-removable media. Computer storage media may be implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 512.

It will be appreciated that FIG. 3 describes software that can act as an intermediary between users and computer resources. This software may include an operating system 528 which can be stored on disk storage 524, and which can control and allocate resources of the computer system 512. Disk storage 524 may be a hard disk drive connected to the system bus 518 through a non-removable memory interface such as interface 526. System applications 530 take advantage of the management of resources by operating system 528 through program modules 532 and program data 534 stored either in system memory 516 or on disk storage 524. It will be appreciated that computers can be implemented with various operating systems or combinations of operating systems.

A user can enter commands or information into the computer 512 through an input device(s) 536. Input devices 536 include but are not limited to a pointing device such as a mouse, trackball, stylus, touch pad, keyboard, microphone, and the like. These and other input devices connect to the processing unit 514 through the system bus 518 via interface port(s) 538. An interface port(s) 538 may represent a serial port, parallel port, universal serial bus (USB) and the like. Output devices(s) 540 may use the same type of ports as do the input devices. Output adapter 542 is provided to illustrate that there are some output devices 540 like monitors, speakers and printers that require particular adapters. Output adapters 542 include but are not limited to video and sound cards that provide a connection between the output device 540 and the system bus 518. Other devices and/or systems or devices such as remote computer(s) 544 may provide both input and output capabilities.

Computer 512 can operate in a networked environment using logical connections to one or more remote computers, such as a remote computer(s) 544. The remote computer 544 can be a personal computer, a server, a router, a network PC, a peer device or other common network node, and typically includes many or all of the elements described above relative to the computer 512, although only a memory storage device 546 has been illustrated in FIG. 4. Remote computer(s) 544 can be logically connected via communication connection 550. Network interface 548 encompasses communication networks such as local area networks (LANs) and wide area networks (WANs) but may also include other networks. Communication connection(s) 550 refers to the hardware/software employed to connect the network interface 548 to the bus 518. Connection 550 may be internal to or external to computer 512 and include internal and external technologies such as modems (telephone, cable, DSL and wireless) and ISDN adapters, Ethernet cards and so on.

It will be appreciated that the network connections shown are examples only and other means of establishing a communications link between the computers may be used. One of ordinary skill in the art can appreciate that a computer 512 or other client device can be deployed as part of a computer network. In this regard, the subject matter disclosed herein man pertain to any computer system having any number of memory or storage units, and any number of applications and processes occurring across any number of storage units or volumes. Aspects of the subject matter disclosed herein may apply to an environment with server computers and client computers deployed in a network environment, having remote or local storage. Aspects of the subject matter disclosed herein may also apply to a standalone computing device, having programming language functionality, interpretation and execution capabilities.

Figure 4:
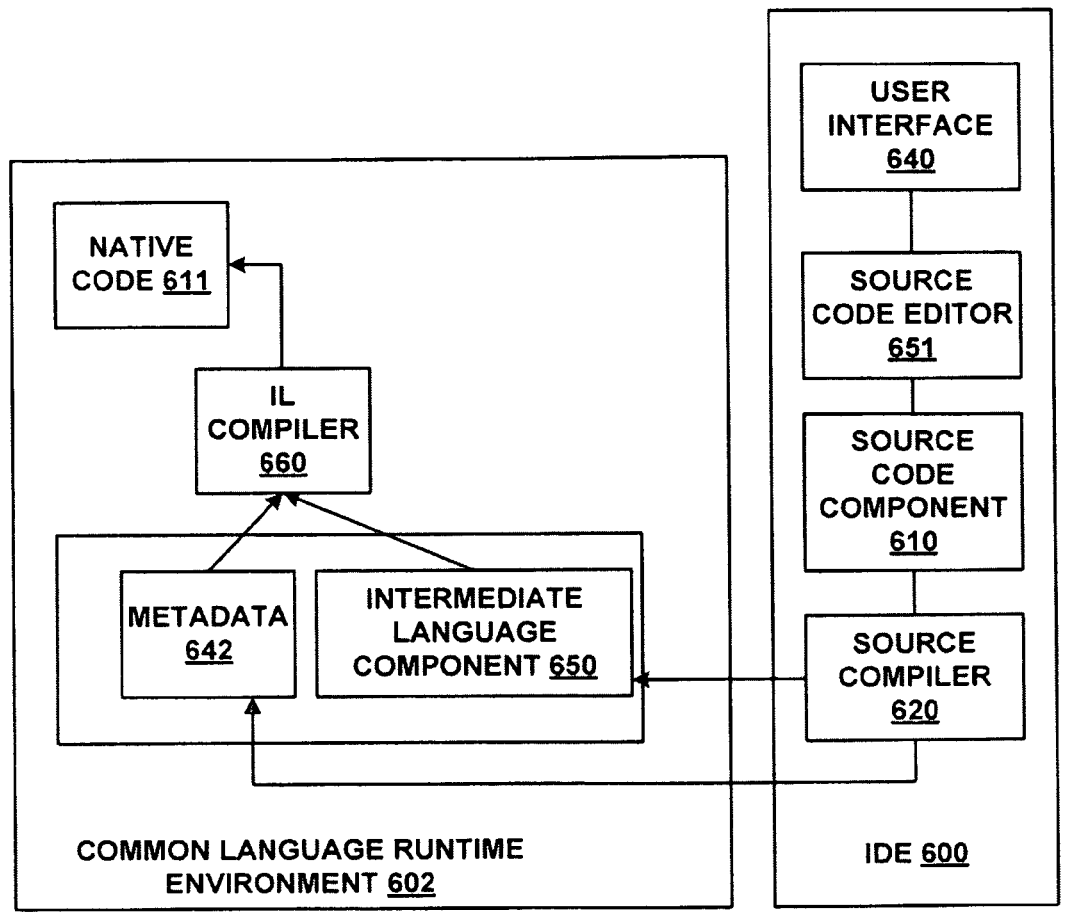
FIG. 4 is a block diagram of an example of an integrated development environment in accordance with aspects of the subject matter disclosed herein.

FIG. 4 illustrates an integrated development environment (IDE) 600 and Common Language Runtime Environment 602. An IDE 600 may allow a user (e.g., developer, programmer, designer, coder, etc.) to design, code, compile, test, run, edit, debug or build a program, set of programs, web sites, web applications, and web services in a computer system. Software programs can include source code (component 610), created in one or more source code languages (e.g., Visual Basic, Visual J#, C++. C#, J#, Java Script, APL, COBOL, Pascal, Eiffel, Haskell, ML, Oberon, Perl, Python, Scheme, Smalltalk and the like). The IDE 600 may provide a native code development environment or may provide a managed code development that runs on a virtual machine or may provide a combination thereof. The IDE 600 may provide a managed code development environment using the .NET framework. An intermediate language component 650 may be created from the source code component 610 and the native code component 611 using a language specific source compiler 620 and the native code component 611 (e.g., machine executable instructions) is created from the intermediate language component 650 using the intermediate language compiler 660 (e.g. just-in-time (JIT) compiler), when the application is executed. That is, when an IL application is executed, it is compiled while being executed into the appropriate machine language for the platform it is being executed on, thereby making code portable across several platforms. Alternatively, in other embodiments, programs may be compiled to native code machine language (not shown) appropriate for its intended platform.

A user can create and/or edit the source code component according to known software programming techniques and the specific logical and syntactical rules associated with a particular source language via a user interface 640 and a source code editor 651 in the IDE 600. Thereafter, the source code component 610 can be compiled via a source compiler 620, whereby an intermediate language representation of the program may be created, such as assembly 630. The assembly 630 may comprise the intermediate language component 650 and metadata 642. Application designs may be able to be validated before deployment.

The various techniques described herein may be implemented in connection with hardware or software or, where appropriate, with a combination of both. Thus, the methods and apparatus described herein, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing aspects of the subject matter disclosed herein. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects, e.g., through the use of a data processing API or the like, may be implemented in a high level procedural or object oriented programming language to communicate with a computer system. However, the program(s) can be implemented in assembly or machine language, if desired. In any case, the language may be a compiled or interpreted language, and combined with hardware implementations.

While the subject matter disclosed herein has been described in connection with the figures, it is to be understood that modifications may be made to perform the same functions in different ways.

What is claimed:

1. A machine comprising:
    a processor and a memory including a project capability analysis module configured to cause the processor to:
    dynamically assemble project system code of a project from project capabilities, wherein the project capabilities are determined from an instance of a build system by querying the build system for the project capabilities, wherein the instance of the build system is generated by a configuration-based build engine based on at least one build input file;
    load the dynamically assembled project system code into an integrated development environment, wherein in response to a change of capabilities of the instance of the build system the project system code is redefined and reassembled; and
    via the integrated development environment, display functionality based on the capabilities to a user via one or more user interfaces.

2. The machine of claim 1, wherein the at least one build input file comprises at least one project file.

3. The machine of claim 2, wherein the at least one project file comprises instructions for building the instance of the build system.

4. The machine of claim 2, wherein a result of an evaluation of a build of the at least one project file determines the project capabilities.

5. The machine of claim 2, wherein the at least one project file describes items of the instance of the build system and how the items are built for particular platforms and configurations.

6. The machine of claim 2, wherein the at least one project file comprises at least one element of project content, wherein the at least one element of project content comprises an item group comprising items, an item definition group comprising item definitions or an item property group comprising properties, wherein the at least one element represents an input into the instance of the build system and directs importation of target files, wherein a target file of the target files imports at least one specified file, wherein the importation of the at least one specified file is conditional based on the project capabilities.

7. A method comprising:
receiving a project system load request for a project;
executing the project system load request, wherein a project system load of the project system load request is performed by a build engine executing on a software development computer, wherein the project system load comprises loading software components of a project system into an integrated development environment based on capabilities of the project;
determining the capabilities of the project based on evaluation of a result of the build engine processing a project file, the project file directing the building of the project;
loading software components into the integrated development environment based on the determined capabilities of the project; and
displaying functionality based on the determined capabilities of the project to a user via one or more user interfaces of the integrated development environment.

8. The method of claim 7, wherein the project file comprises at least one item group, wherein the at least one item group explicitly states a capability of the project.

9. The method of claim 8, wherein the at least one item group specifies a target file, wherein the target file is imported into the project and wherein the target file is describes a capability of the project.

10. The method of claim 9, wherein an import statement in the project file conditionally links the project file and a part of the instance of the build system.

11. The method of claim 7, further comprising:
wherein the project file comprises at least one item group, wherein the at least one item group represents an input into the instance of the build system and directs importation of target files, wherein a target file of the target files imports at least one specified file, wherein the importation of the at least one specified file is conditional based on a capability of the project.

12. The method of claim 8, further comprising:
automatically reassembling the project system in response to a change in the capabilities of the instance of the build system.

13. The method of claim 12, wherein the project system is reassembled in response to receiving a request for a project system load.

14. A computer-usable storage medium, excluding transmission and propagation medium, comprising computer-executable instructions which when executed cause at least one processor to:
execute a project system load request, wherein the project system load request comprises a request to load software components of a project comprising a project system into an integrated development environment based on capabilities of the project;
determine the project capabilities of the project based on a result of an evaluation of a build generated by a build engine processing a project file, the project file directing building of the project;
load software components into the integrated development environment based on the determined project capabilities;
via the integrated development environment, display functionality associated with the capabilities to a user via one or more user interfaces; and
automatically reevaluate and reassemble the project system in response to a change in the project capabilities.

15. The computer-usable storage medium of claim 14, comprising further computer-executable instructions, which when executed cause the at least one processor to:
assemble the project system in response to receiving a request for a project system load in the integrated development environment.

16. The computer-usable storage medium of claim 14, comprising further computer-executable instructions, which when executed cause the at least one processor to:
process the project file, the project file comprising at least one item group, wherein the at least one item group explicitly states a project capability of the project capabilities.

17. The computer-usable storage medium of claim 14, comprising further computer-executable instructions, which when executed cause the at least one processor to:
process the project file, the project file comprising instructions for building an instance of the build system for the project.

18. The computer-usable storage medium of claim 14, comprising further computer-executable instructions, which when executed cause the at least one processor to:
conditionally link the project file and a part of the build system.

19. The computer-usable storage medium of claim 18, comprising further computer-executable instructions, which when executed cause the at least one processor to:
evaluate a build result of the project file to determine the project capabilities.

* * * * *